(12) United States Patent
Morris et al.

(10) Patent No.: US 11,149,887 B2
(45) Date of Patent: Oct. 19, 2021

(54) FLUID DUCT

(71) Applicant: DUPONT POLYMERS, INC., Wilmington, DE (US)

(72) Inventors: Bryan Martin Morris, Coppet (CH); Alain Kim, Carouge (CH); Michel C. Renaud, Prangins (CH)

(73) Assignee: DUPONT POLYMERS, INC., Wilmington, DE (US)

( * ) Notice: Subject to any disclaimer, the term of this patent is extended or adjusted under 35 U.S.C. 154(b) by 0 days.

(21) Appl. No.: 16/624,357

(22) PCT Filed: Jun. 18, 2018

(86) PCT No.: PCT/US2018/038036
§ 371 (c)(1),
(2) Date: Dec. 19, 2019

(87) PCT Pub. No.: WO2018/236731
PCT Pub. Date: Dec. 27, 2018

(65) Prior Publication Data
US 2020/0124214 A1    Apr. 23, 2020

Related U.S. Application Data (60) Provisional application No. 62/521,688, filed on Jun. 19, 2017.

(51) Int. Cl.
*F16L 21/03* (2006.01)
*F16L 33/10* (2006.01)
(Continued)

(52) U.S. Cl.
CPC ....... *F16L 33/10* (2013.01); *F02M 35/10144* (2013.01); *F16L 21/005* (2013.01);
(Continued)

(58) Field of Classification Search
CPC ....... F16L 21/005; F16L 21/002; F16L 21/02; F16L 21/03
(Continued)

(56) References Cited

U.S. PATENT DOCUMENTS 3,743,329 A * 7/1973 Wesel, Sr. ............. F16L 21/005
285/236
4,643,465 A * 2/1987 Green ................... F16L 21/005
285/236
(Continued)

FOREIGN PATENT DOCUMENTS

EP          0339234 A1   11/1989
WO     20161022676 A1    2/2016

OTHER PUBLICATIONS

International Search Report and Written Opinion in International Application No. PCT/US2018/038036, dated Sep. 26, 2018.

*Primary Examiner* — David Bochna (57) ABSTRACT

Provided herein is a fluid duct (8) comprising a fluid duct connection end portion (12) for coupling to a component connection end portion (4) via a sealing ring (6), the fluid duct connection end portion comprising a clamping ring seat (14) configured for receiving an adjustable clamping ring therearound, the clamping ring seat (14) extending axially (A) between an entry flange (16) and a tube joining section (18), the tube joining section (18) extending into a fluid duct tube portion (10). The clamping ring seat (14) comprises an extension fold (20) configured to allow the clamping ring seat (14) to expand radially due to a widening of the expansion fold (20).

18 Claims, 9 Drawing Sheets

(51) Int. Cl.
*F02M 35/10* (2006.01)
*F16L 25/14* (2006.01)
*F16L 47/12* (2006.01)
*F16L 21/00* (2006.01)

(52) U.S. Cl.
CPC ............... *F16L 21/03* (2013.01); *F16L 25/14* (2013.01); *F16L 47/12* (2013.01)

(58) Field of Classification Search
USPC ........................................ 285/322, 374, 903
See application file for complete search history.

(56) References Cited

U.S. PATENT DOCUMENTS

| | | | |
|---|---|---|---|
| 6,715,799 B2 * | 4/2004 | Hardy | F16L 11/15 285/223 |
| 10,006,417 B2 * | 6/2018 | Satarino | F16L 21/007 |
| 2003/0006610 A1 * | 1/2003 | Werth | F16L 33/225 285/243 |
| 2003/0127856 A1 * | 7/2003 | Youssefifar | F16L 25/0045 285/319 |
| 2007/0170721 A1 * | 7/2007 | Cook | F16L 21/005 285/256 |
| 2014/0339809 A1 | 11/2014 | Rollins et al. | |
| 2015/0219261 A1 * | 8/2015 | Anderson | F16L 21/03 285/307 |

* cited by examiner

FLUID DUCT

CROSS-REFERENCES TO RELATED APPLICATIONS

This application claims priority under 35 U.S.C. §§ 365 and 371 to International Application No. PCT/US2018/038036, filed on Jun. 18, 2018, which in turn claims priority to U.S. Provisional Appln. No. 62/521,688, filed on Jun. 19, 2017, each of which is incorporated herein by reference in its entirety.

FIELD OF THE INVENTION

This invention relates to a fluid duct, in particular a connection end portion of a fluid duct. The fluid duct may be used to convey air, gas or liquids, in particular in automotive applications, for instance in an airflow system of a vehicle engine.

BACKGROUND OF THE INVENTION

In automotive applications, airflow systems guide airflow from inlets to various engine components that require air for cooling, for combustion, or for ventilating the passenger compartment. Fluid flow systems with tubular ducts that connect to components requiring air for cooling, for combustion, or for other purposes may also be found in non-automotive applications. Many fluid flow ducts are made of a blow-molded polymer material. The tubular fluid duct needs to be connected to the engine components and typically has a connection end portion that is inserted over a connection end portion of the engine component, for instance the inlet of a turbo charger. Typically, a clamping ring is positioned around the connection end portion of the fluid duct and is tightened in order to ensure secure fixing of the fluid duct to the component. A seal made of an elastic polymer or rubber material is usually positioned between the fluid duct and component in order to hermetically seal the fluid duct to the component. Other configurations include welded on injection molded coupling systems or crimped on metallic systems.

In an automotive engine, environmental conditions are harsh and components are subjected to large temperature variations and mechanical vibration. The mechanical and thermal stresses applied on the connection portion of the fluid duct may lead to rupture or to a loosening and subsequent uncoupling of the connection. A tight fit between the fluid duct connection portion, seal and component connection portion is desirable for good sealing and reliability of the connection. The latter however leads to high insertion forces during assembly of the connection portions. This in turn leads to higher manufacturing costs but also increased risk of a faulty connection during assembly, for instance in which the seal is unevenly deformed or incorrectly seated. High insertion forces may thus lead to poor sealing and a connection prone to uncoupling or rupture.

SUMMARY OF THE INVENTION

In view of the foregoing, it is an object of this invention to provide a fluid duct with a connection end portion that is easy to assemble to a complementary component yet ensures a reliable connection, in particular one that reduces the risk of rupture or uncoupling and is well sealed.

It would be advantageous to provide a fluid duct that is economical to manufacture.

It would be advantageous to provide a fluid duct with a connection end portion that is easy to assemble, while being strong and durable.

One or more objects of this invention have been achieved by providing the fluid duct according to claim 1.

Disclosed herein is a fluid duct comprising a fluid duct connection end portion for coupling to a component connection end portion, the fluid duct connection end portion comprising a clamping ring seat configured for receiving an adjustable clamping ring therearound.

The clamping ring seat extends axially (A) between an entry section and a tube joining section, the tube joining section extending into a fluid duct tube portion. The clamping ring seat comprises an expansion fold configured to allow at least a portion of the clamping ring seat to expand radially due to a widening of the expansion fold.

In an embodiment, the fluid duct connection end portion couples to a component connection end portion via a sealing ring, the sealing ring extending along an inner surface of the fluid duct connection end portion from the entry section to the tube joining section.

In an embodiment, the sealing ring comprises an entry flange configured to abut against the entry flange of the fluid duct, a mid-section extending along an inner surface of the clamping ring seat, and an end section comprising a compression sealing protrusion extending radially outwardly for compression against an inner surface of the tube joining section.

In an advantageous embodiment, the end section of the sealing ring comprises at least one flexible sealing lip in addition to the compression sealing protrusion.

In an embodiment, the expansion fold comprises at least one oblique section extending at least partially in a circumferential direction and at least partially in a radial direction across the clamping ring seat.

In an advantageous embodiment, the expansion fold comprises a plurality of oblique sections.

In an advantageous embodiment, the oblique sections comprise at least a pair of oblique sections that converge towards an apex.

In an advantageous embodiment, the expansion fold forms a continuous path circumscribing the clamping ring seat.

In an advantageous embodiment, the expansion fold comprises a wave shape section including a pair of oblique sections.

In an advantageous embodiment, the wave shape section extends over a circumferential angle of between 10° and 60°, preferably between 10° and 45°, based on the circumference of the clamping ring.

In an embodiment, the expansion fold comprises at least a pair of wave shaped sections arranged evenly around the axis (A) of the fluid duct connection end portion.

In an advantageous embodiment, the expansion fold comprises oblique sections that extend essentially from a first edge of the clamping ring seat to an opposed second edge of the clamping ring seat, the first and second edges at opposed axial ends of the clamping ring seat.

In an advantageous embodiment, the tube joining section comprises a tapered radially outward section extending from the clamping ring seat and a tapered radially inward section extending to a fluid duct tube portion, an inner surface of the tube joining section receiving a compression sealing protrusion of the sealing ring thereagainst.

In an advantageous embodiment, the fluid duct connection end portion is made of a blow molded polymer.

In an advantageous embodiment, the expansion fold is in the form of an inwardly indented groove protruding radially inwardly.

In an advantageous embodiment, the expansion fold has a width in the range of 0.25 to 3 times the wall thickness of the clamping ring seat, preferably 0.5 to 2 times the wall thickness of the clamping ring seat.

In an advantageous embodiment, the expansion fold comprises a groove protruding radially inwardly, wherein a radial depth of the groove is in a range of 0.25 to 2 times the thickness of a wall of the clamping ring seat.

The advantages and features of novelty that characterize the invention are pointed out with particularity in the claims annexed hereto and forming a part hereof. For a better understanding of the invention, its advantages, and the objects obtained by its use, however, reference should be made to the drawings which form a further part hereof, and to the accompanying descriptive matter, in which there is illustrated and described one or more preferred embodiments of the invention.

BRIEF DESCRIPTION OF THE DRAWINGS

The invention will now be described with reference to the accompanying drawings, which by way of example illustrate the present invention and in which:

FIG. 1b is a longitudinal cross sectional view of the assembly of FIG. 1a;

FIG. 7b is a longitudinal cross sectional view of the fluid duct of FIG. 7a;

DETAILED DESCRIPTION

Figure 1A:
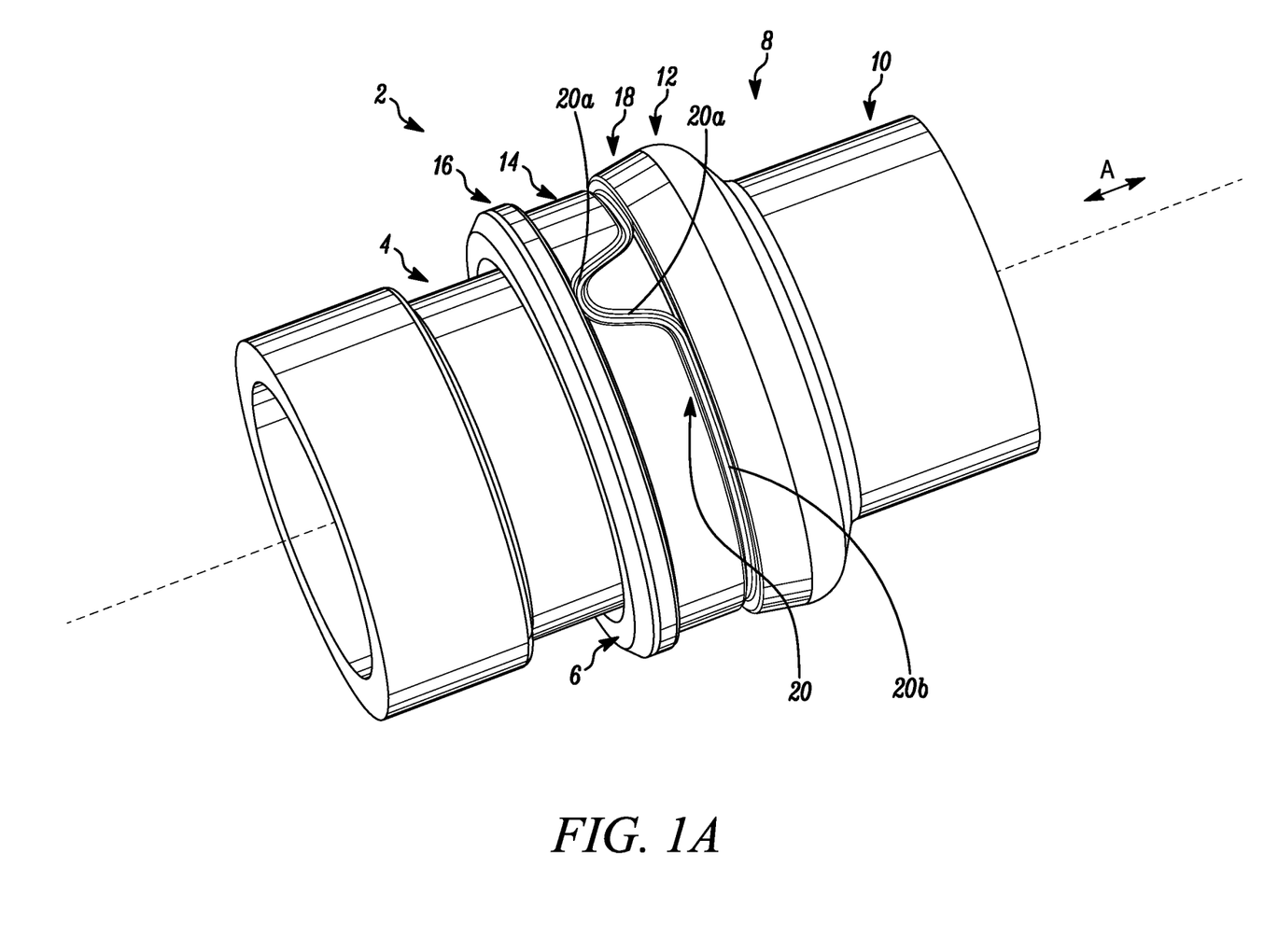
FIG. 1a is a perspective view of part of a fluid flow system, showing a connection portion of a fluid duct according to an embodiment of the invention coupled to a component connection end portion.

Referring now to the drawings, wherein like reference numerals designate corresponding structure throughout the views, and referring in particular to FIG. 1A, a fluid flow system 2 comprises a fluid duct 8 for connection to a connection end portion of a component 4. The fluid flow system 2 may for instance be an automotive engine compartment for supplying air to a combustion engine, for instance a turbo charger of a combustion engine. The fluid flow system 2 may however also find uses in other applications for channeling air and other fluids including liquids in a variety of automotive and non-automotive applications.

Figure 1B:
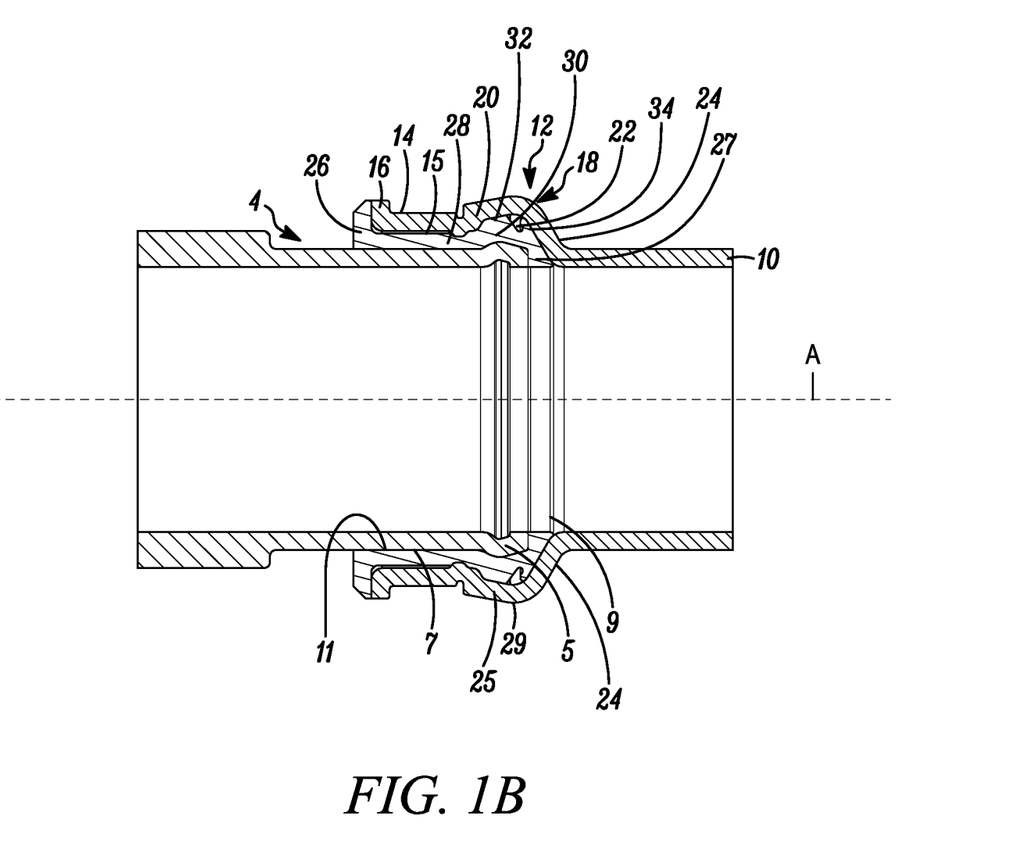
Figure 2:
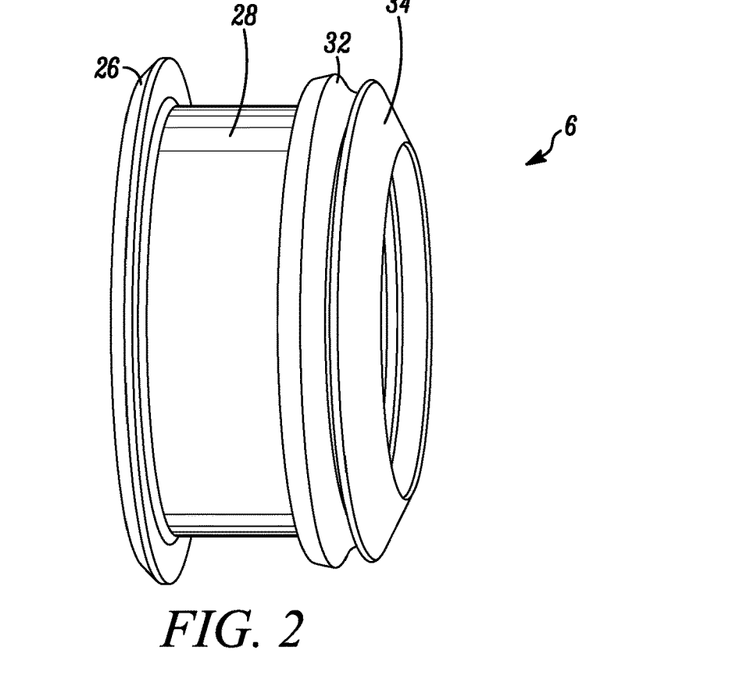
FIG. 2 is a view in perspective of a sealing ring of a fluid flow system according to an embodiment of the invention.
Figure 3A:
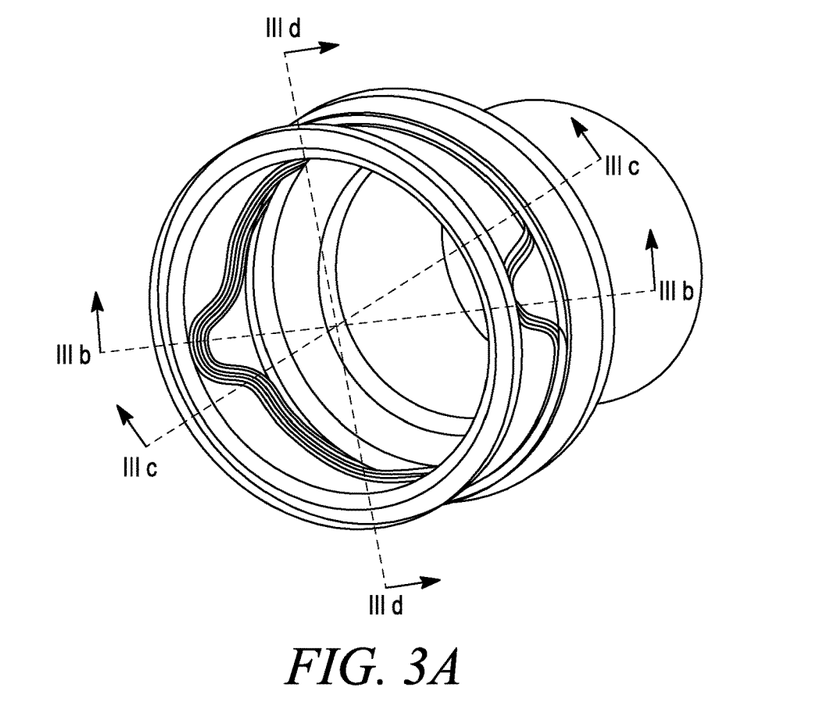
FIG. 3a is a view in perspective of a connection portion of a fluid duct according to an embodiment of the invention.
Figure 3B:
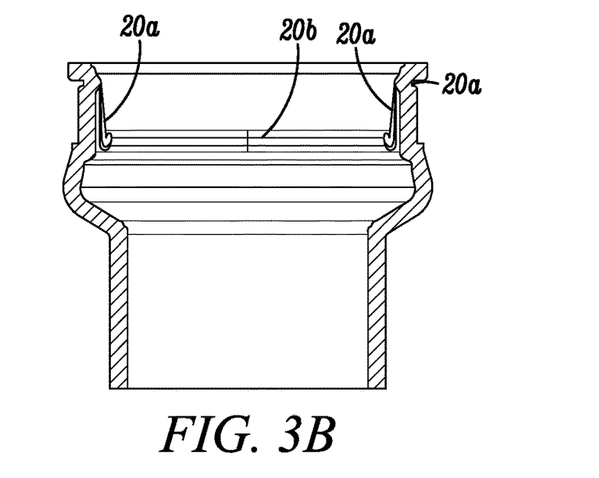
FIGS. 3b, 3c, and 3d are cross sectional views through lines IIIb-IIIb, IIIc-IIIc and IIId-IIId respectively.
Figure 3C:
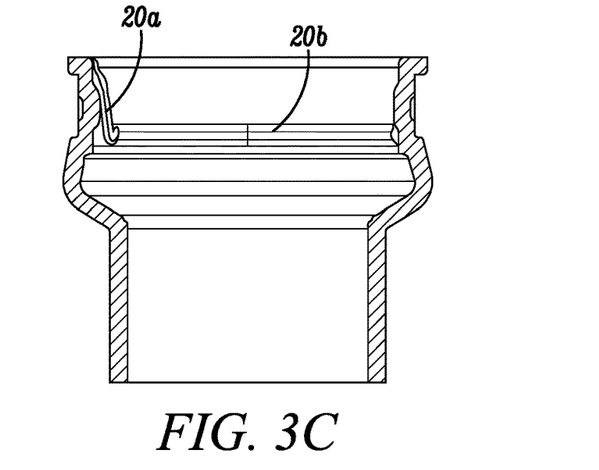
Figure 3D:
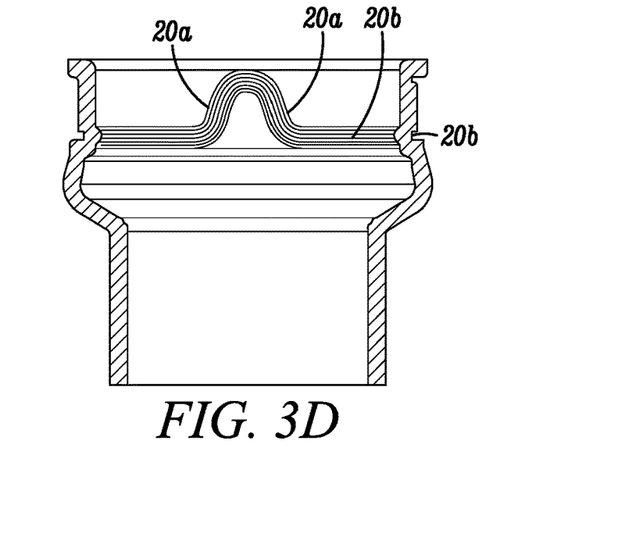

The fluid flow system 2 may further comprise a sealing ring 6 positioned between the duct 8 and the component connection end portion 4 to ensure a hermetic seal between the component 4 and fluid duct 8, as best seen in FIGS. 1a and 1b. In an embodiment, the sealing ring 6 is made of an elastomeric polymer such as EPDM (Ethylene-propylene diene rubber), EPM (Ethylene-propylene rubber), EU (Urethane rubber polyether), FKM (Fluorocarbon rubber), FFKM (Perfluorinated elastomer), AEM (Ethylene acrylic rubber), ABR (Acrylic ester-butabiene rubber), ACM (Polyacrylate rubber), ACN (Acrylonitrile), SBR (Styrene butadiene rubber), NBR (Nitrile butadiene rubber), HNBR (Hydrogenated nitrile rubber), NR (Natural rubber), CPE or CM (Chlorinated polyethylene), CSM (Chorosulfonated polyethylene), CR (chloroprene (neoprene) rubber), BR (Polybutadiene rubber), ECO (Epichlorohydrin rubber), VMQ (Silicone rubber with vinyl groups), FVMQ (Fluorosilicone rubber), TPV (Thermoplastic vulcanizate), TPE (Thermoplastic elastomer), TPO (Thermoplastic polyolefin), TPU (Thermoplastic polyurethane), EAR (Ethylene-acrylic acid copolymer), ERM (Ethylene-acrylate copolymer), EVA or EVM (Ethylene vinylacetate copolymer), IR (Polyisoprene), HR (Butyl rubber), or a mixture or blend including two or more of these elastomeric polymers.

Figure 7A:
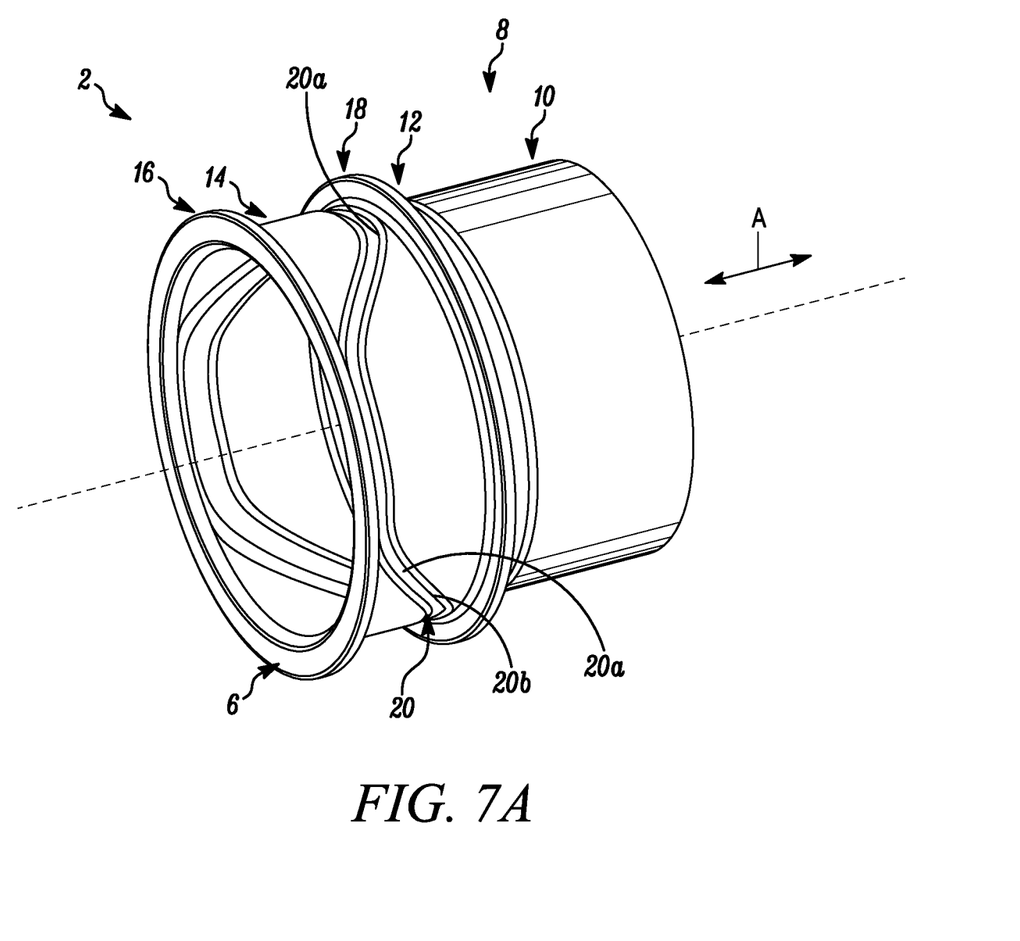
FIG. 7a is a perspective view of a connection portion of a fluid duct according to another embodiment of the invention.
Figure 7B:
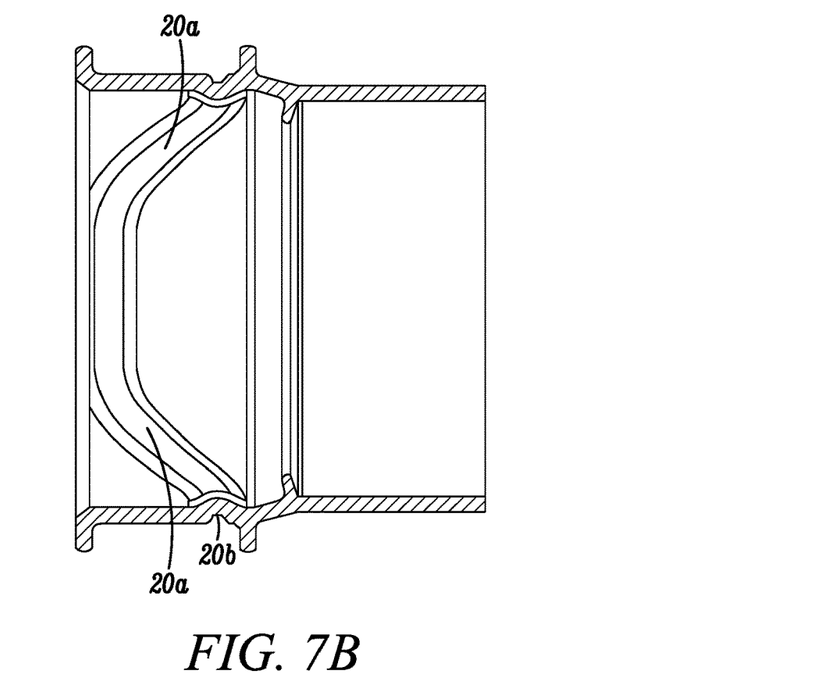
Figure 7C:
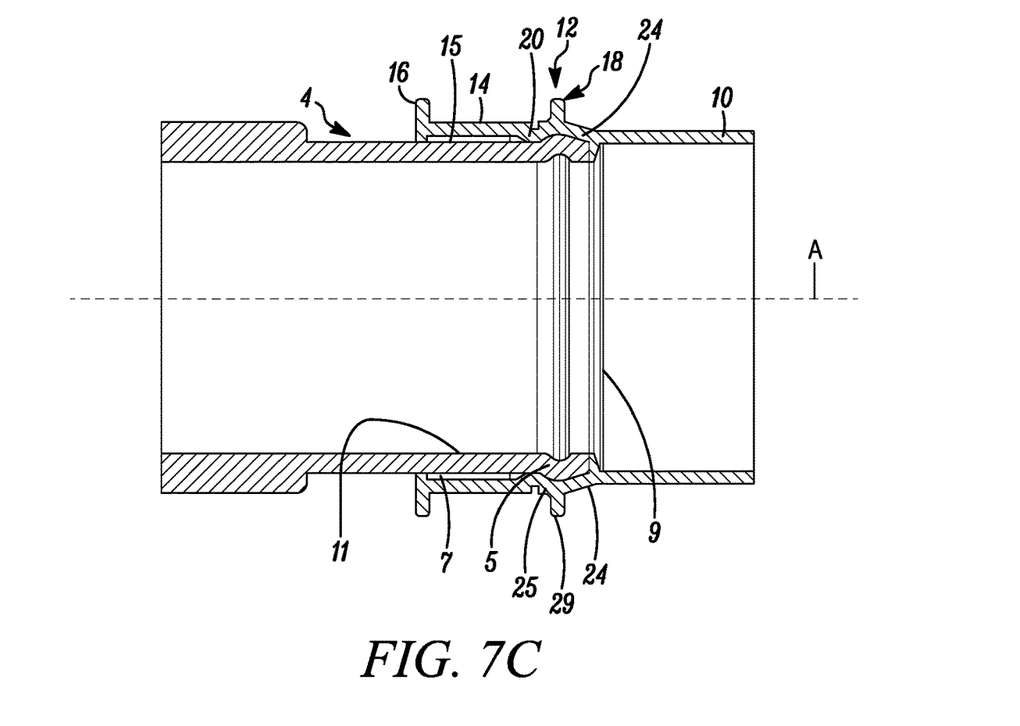
FIG. 7c is a longitudinal cross sectional view of the fluid duct of FIGS. 7a, 7b coupled to a component connection end portion.

In a variant, the duct 8 may couple to the component connection end portion 4 without a separate sealing ring 6, as best seen in FIGS. 7a to 7c.

In another variant (not depicted in the Drawings), a sealing ring may be integrally formed on an inside surface of the duct, for example by multi component molding or by other techniques such as welding, adhesive bonding and other per se known bonding techniques.

In yet another variant (not depicted in the Drawings), a sealing ring may also be formed on the component connection end portion.

In an embodiment, the fluid duct 8 is made of a polymer, preferably a thermoplastic resin, which may include aliphatic polyesters (e.g. Polylactic acid (PLA)), semi-aromatic copolyesters (e.g. Polybutylene terephthalate (PBT), Polyethylene terephathalate (PET)), aliphatic polyamides (e.g. homopolymers such as PA6, PA66, PA46, PA1010, PA610, PA612, PA12, PA11 or copolymers such as PA6/66, PA6/6T, PA66/6T PA66/610, PA612/6T), Polyethylene (e.g. HDPE, LDPE, LLDPE), Polar ethylene copolymers (e.g. ethylene copolymers with unsaturated alcohols such as EVOH, ethylene/acrylic acid copolymers (EAA) such as ionomers, ethylene copolymers with unsaturated esters such as ethylene-vinyl acetate (EVA)), Polypropylene (PP), Acrylic resins (e.g. polymethyl methacrylate (PMMA)), Polycarbonate (PC), Polylactic acid (PLA), Polyether sulfone (PES), Polyetherether ketone (PEEK), Polyetherimide (PEI), Polyphenylene oxide (PPO), Polyphenylene sulfide (PPS), Polystyrene (PS), Polyvinyl chloride (PVC), Polyimide (PI), Thermoplastic elastomer (TPE) (e.g. thermoplastic copolyester elastomer (TPC-E or TEEE such as TPC-ET, TPC-EE, TPC, ES, TPC-EC), styrenic block copolymers (TPE-S), thermoplastic polyolefins (TPC)), thermoplastic vulcanisates (TPV), thermoplastic polyurethans (TPU), thermoplastic polyether block amides (TPE-A), and mixtures or blends of two or more of these polymers.

The fluid duct 8 may be formed by blow-molding or by other molding, injection or extrusion manufacturing methods. The fluid duct 8 may be made of a homogeneous material or may be formed of composite materials, for instance including fiber reinforced polymers. The fluid duct 8 may be made of a monolayer (mono-material) or of a co-extrusion or sequential co-extrusion of a multi-layer combination of different materials including regrind.

In the illustrated examples, the component connection end portion 4 has a generally cylindrical tubular shape comprising an annular protuberance 5 proximate to an insertion end 9 of the component. A smooth cylindrical sealing surface 7 extends axially from the protuberance 5. The annular protuberance 5 serves to improve locking of the component connection end portion 4 within the fluid duct 8 in the fully assembled position.

In the embodiment of FIG. 1b, the cylindrical sealing surface 7 receives an inner sealing surface 11 of the sealing ring 6 thereagainst.

The fluid duct 8 comprises a fluid duct tube portion 10 that forms a conduit to other elements of the fluid flow system (not shown), extending into a fluid duct connection end portion 12 that serves to couple the fluid duct 8 to the component connection end portion 4. The fluid duct connection end portion 12 comprises a generally cylindrical tubular clamping ring seat 14 extending in an axial direction A between an entry section 16 and a tube joining section 18. The entry section 16 may advantageously comprise a flange. The clamping ring seat 14 is configured to receive therearound an adjustable clamping ring as per se known in the art. Such clamping rings are configured to be tightened around the clamping ring seat in order to compress the clamping ring seat 14.

In the embodiment of FIGS. 1a and 1b, the clamping ring seat 14 compresses against the sealing ring 6 which in turn presses against the sealing surface 7 of the component connection end portion 4.

In the embodiment of FIGS. 7a and 7b, the clamping ring seat 14 compresses directly against the component connection end portion 4. The annular protuberance 5 may serve not only to improve locking of the component connection end portion 4 within the fluid duct 8 in the fully assembled position, but also to provide a seal between the component and fluid duct 8.

In the illustrated embodiments, the fluid duct connection end portion 12 and tube portion 10 have a circular cross-sectional profile. In variants, the fluid duct connection end portion 12 and/or tube portion 10 may have other cross-sectional profiles such as elliptical, polygonal, oval, and irregular shapes without departing from the scope of the invention.

In the illustrated embodiments, the tube joining section 18 protrudes radially outwards from the clamping ring seat 14. The tube joining section 18 tapers radially inwardly from its crest via a tapered section 24 to join the fluid duct tube portion 10 that may have a diameter smaller than the diameter of the clamping ring seat 14. However, depending on the diameter and/or profile of the fluid duct tube portion 10, the tube joining section 18 may have various shapes and profiles. In a preferred embodiment, however, the tube joining section 18 comprises an outwardly tapered section 25 extending from the clamping ring seat such that an inner sealing surface 22 of the tube joining section 18 has a diameter that is greater than the inner diameter of the clamping ring seat 14. The latter configuration helps to ensure that the annular protuberance 5 of the component connection end portion 4 is seated within the tube joining section 18 and a high resistance against extraction is provided when a clamping ring is tightened around the clamping ring seat 14.

In an advantageous embodiment, the sealing ring 6 comprises an entry flange 26 configured to abut against the entry section 16 of the fluid duct 8, an end section 30 configured to seat against the inner surface 22 of the tube joining section 18, and a mid-section 28 extending between the entry section flange 16 and end section 30. The end section 30 may advantageously comprise a compression sealing protrusion 32 protruding radially outwardly beyond the mid-section 28 and configured for compression between the component connection end portion 4 and the inner surface 22 of the tube joining section 18. In an advantageous embodiment, the end section 30 of the sealing ring 6 may further comprise one or more sealing lips 34 that are configured to be supple and foldable to press against the inner surface 22 of the tube joining section 18, forming additional sealing means. The end section 30 of the sealing ring 6 may further comprise a radially inwardly directed flange 27 that forms a stop compressed between an insertion end 9 of the component connection end portion 4 and an inner surface of the tapered section 24 of the tube joining section 18 as best seen in FIG. 1b. Positive feedback for the completion of insertion during assembly of the fluid duct 8 and the component may thus be provided.

A thin gap 15 may be provided between the radially inner side of the clamping ring seat 14 and the radially outer side of the seal mid-section 28 (FIG. 1b) or the radially outer side of the component (FIG. 7c) to help reduce the insertion force and also to allow for manufacturing or thermal tolerance take-up. In the embodiment of FIG. 1b, the gap 15 allows expansion of the elastomeric or rubber sleeve within the fluid duct 8. The gap 15 may be closed once a clamping ring is tightened around the clamping ring seat 14.

The clamping ring seat 14 described herein comprises one or more expansion folds 20. The expansion folds 20 comprise at least one oblique section 20a extending in a partially axial and partially circumferential direction configured to allow the clamping ring seat 14 to expand slightly radially outwardly during insertion of the component connection end portion 4 within the sealing ring 6 and fluid duct connection end portion 12. The expansion fold 20 also allows for some radial compression of at least a portion of the clamping ring seat 14 by a clamping ring (not depicted in the Drawings) tightened around the clamping ring seat 14 when the component and fluid duct 8 are fully inserted together. It may be noted that the radial expansion or contraction may not be axisymmetrical; for instance, the clamping ring seat 14 may deform from a circular into a substantially oval shape.

Figure 4A:
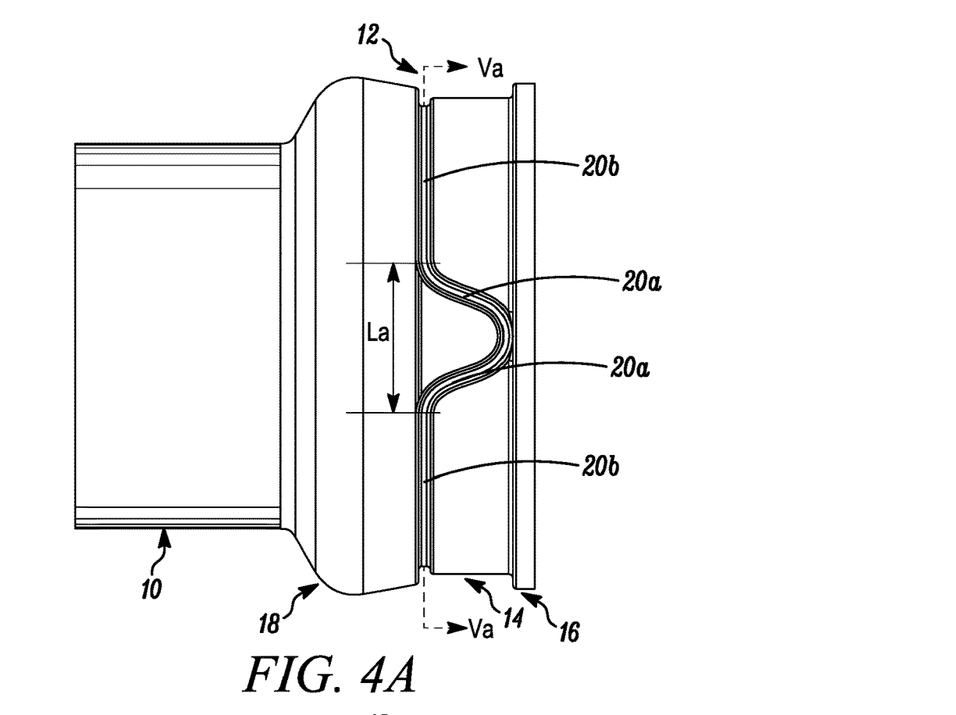
FIG. 4a is a plan view of the connection portion of a fluid duct shown in FIG. 3a and FIG. 4b is a view of a connection portion of a fluid duct according to another embodiment of the invention.
Figure 4B:
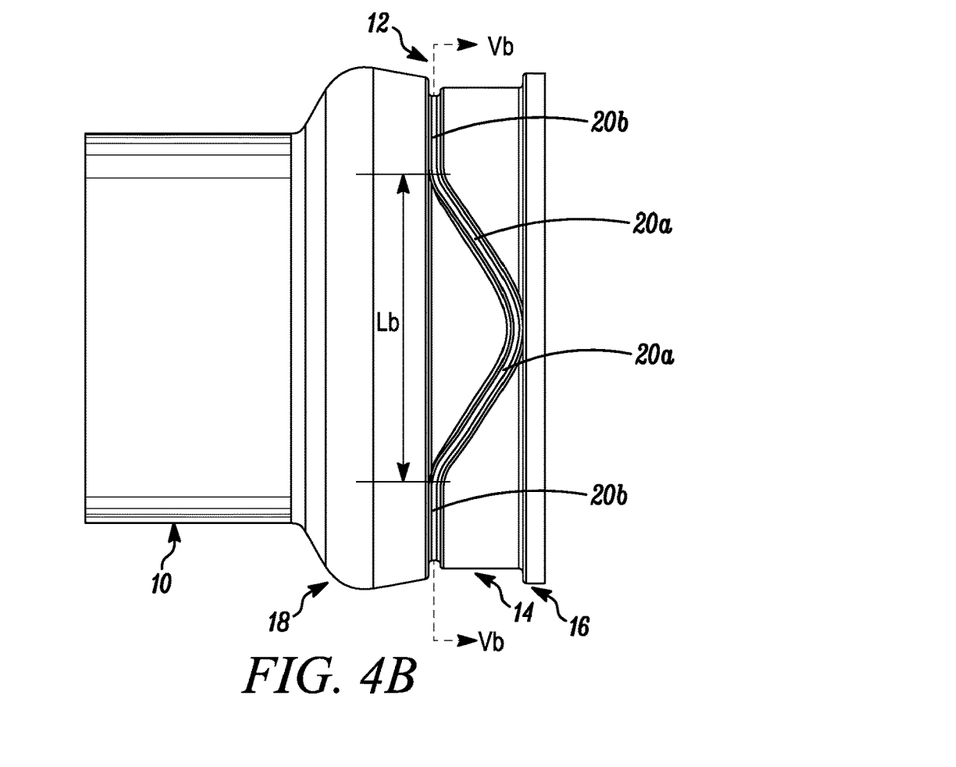
Figure 5A:
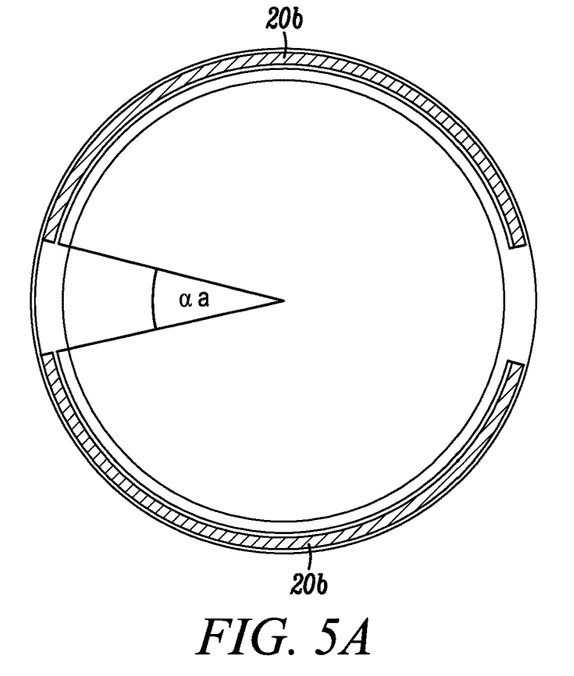
FIGS. 5a and 5b are schematic cross-sectional views through lines Va-Va and Vb-Vb of FIGS. 4a and 4b respectively, to illustrate the circumferential angle of a wave shape fold section.
Figure 5B:
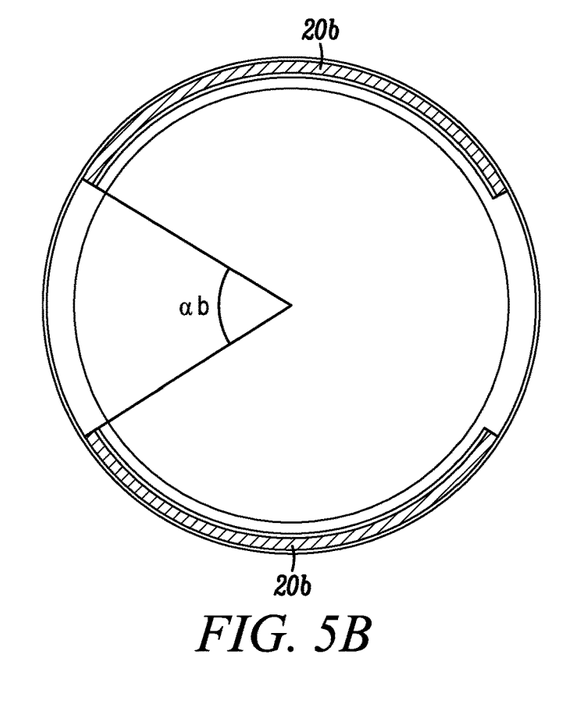

In an advantageous embodiment, the expansion fold 20 may be in the form of a continuous bead groove encircling the clamping ring seat 14. In the illustrated embodiment, the oblique sections 20a are interconnected by circumferential sections 20b that may be positioned alongside an axial edge of the clamping ring seat 14. In the illustrated embodiment, the oblique sections 20a may form part of a wave shape expansion fold section as illustrated in FIGS. 4a and 4b. The embodiment illustrated in FIG. 4a illustrates a wave with a fairly short length $L_a$ and the embodiment of FIG. 4b with a length $L_b$ which is greater than $L_a$. The wave shape expansion fold section 20 comprises two oblique sections 20a and may extend over an angle αa, αb around the circumference that is in a range of 10° to 170°, preferably in the range of 10° to 60°, more preferably in a range of 10° to 45°, as illustrated in FIGS. 5a and 5b, with respect to the circumference of the clamping ring seat 14.

In a preferred embodiment, there are two or more wave shape expansion fold sections 20, or pairs of oblique sections 20a, distributed preferably evenly around the axis A of the clamping ring seat 14. Although the expansion fold 20 is illustrated as a continuous groove/bead, in variants (not depicted in the Drawings) it is possible to provide a non-continuous expansion fold comprising oblique sections 20a, for instance where the circumferential sections 20b are interrupted. Advantageously, the oblique sections 20a allow the clamping ring seat 14 to expand slightly circumferentially by widening of the fold, as opposed to expansion solely due to traction in the material of the clamping ring seat 14 without provision of an expansion fold.

Figure 6A:
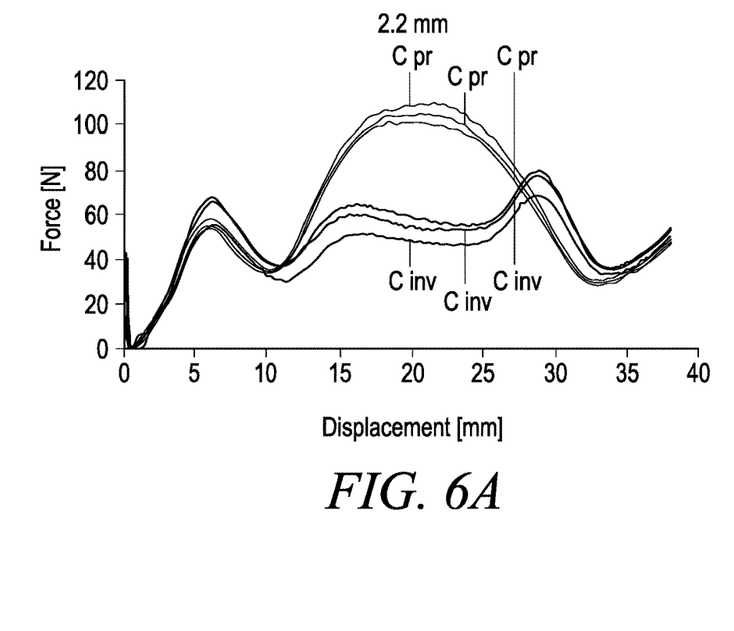
FIGS. 6a and 6b are graphical representations of a relationship between the insertion displacement and the applied insertion force of a component connection end portion into a connection portion of a fluid duct during assembly, for a prior art fluid duct and a fluid duct according to embodiments of the invention.
Figure 6B:
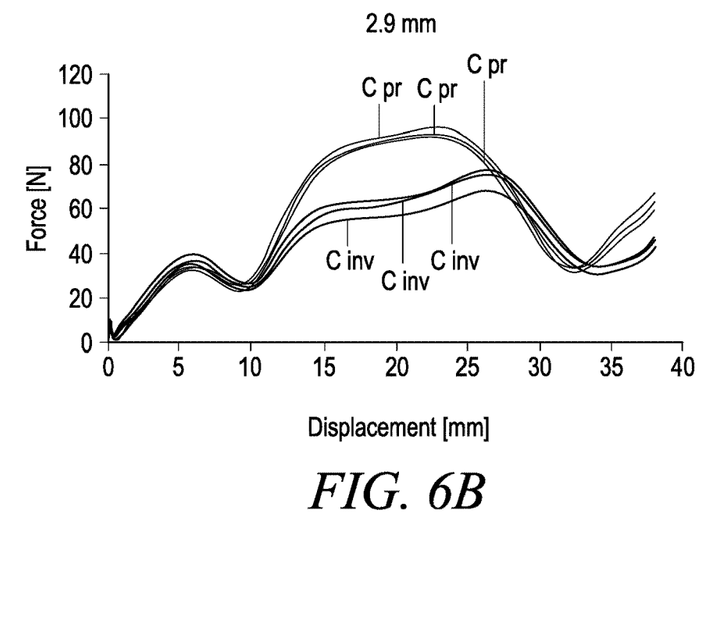

FIGS. 6a and 6b illustrate the forces of insertion of a component into a sealing ring 6 within a fluid duct connection end portion 12. The curves $C_{inv}$ depict the force that is applied as a function of the insertion displacement for a polymer fluid duct 8 as described herein with a wall thickness of 2.2 mm (FIG. 6a) or 2.9 mm (FIG. 6b), compared to the curves $C_{pr}$ depicting the insertion force for a fluid duct 8 of similar dimensions but without any expansion fold 20. As may be noted, in a fluid duct 8 without expansion fold 20, the peak forces are significantly higher than in a fluid duct 8 with an expansion fold 20 as described herein, the improvement ranging between 22 and 43% in the illustrated examples. See the Table, below, which sets forth the peak forces measured as the connection end portion of the component 4 is inserted into the sealing ring 6 at a speed of 500 mm/min. The pull-out forces (not depicted in the Drawings) of the illustrated example are similar for fluid ducts 8 with and without expansion folds 20.

TABLE

| Tube Thickness, mm | Insertion force, no wave | Insertion force, N, wave | Improvement |
|---|---|---|---|
| 2.2 | 105.3 | 75.0 | 29% |
| 2.5 | 252.4 | 144.7 | 43% |
| 2.9 | 467.7 | 366.0 | 22% |

The expansion folds 20 may advantageously be produced by blow molding with the other portions of the fluid duct 8 by providing a corresponding profile in the form of a bead on the blow molding die that forms the fluid duct connection end portion 12. Although the expansion fold 20 is in the form of a groove/bead that extends radially inwardly, in other variants, it is also possible to have an expansion fold 20 that protrudes radially outwardly or that is provided with more than one fold, for instance adjoining convex and concave beads. The expansion fold 20 may advantageously be provided with at least two opposed wave shape sections as shown in the embodiments illustrated in FIGS. 3a to 4a, but it is also possible to have three, four or a greater plurality of wave shapes extending around the clamping ring seat 14.

In variants, the expansion folds 20 may also be produced by extrusion or injection molding with the other portions of the fluid duct.

In an embodiment, the oblique sections 20a advantageously extend from a first edge of the clamping ring seat 14 to an opposed second edge of the clamping ring seat 14, however in variants, the oblique sections 20a may extend only partially between opposed edges of the clamping ring seat 14.

As illustrated, the oblique sections 20a preferably have angles that are configured such that the pair of oblique sections 20a converge towards an apex in the axial direction A.

While certain of the preferred embodiments of the present invention have been described and specifically exemplified above, it is not intended that the invention be limited to such embodiments. Rather, it is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

LIST OF REFERENCES IN THE DRAWINGS 2 fluid flow system (e.g. automotive)
    4 component connection end portion
        5 annular protuberance
        7 sealing surface
        9 insertion end
    6 sealing ring
        26 entry section (entry flange)
        28 mid-section
        30 end section
            32 compression sealing protrusion
            34 sealing lip
        27 end flange
    8 fluid duct
        10 fluid duct tube portion
        12 fluid duct connection end portion
            14 clamping ring seat
                20 expansion fold
                    20a oblique sections
                    20b circumferential sections
        16 entry flange
        18 tube joining section
            22 inner surface
            24 tapered section
            25 tapered section
            29 crest
    15 gap
A center longitudinal axis/compression axis/axial direction
$C_{inv}$ force/displacement curves for insertion of a component in a fluid duct according to the invention
$C_{pr}$ force/displacement curves for assembly of a component in a fluid duct according to the prior art
α circumferential angle of a wave shape expansion fold section
$L_a$, $L_b$ circumferential length of a wave shape expansion fold section

The invention claimed is:

1. Fluid duct (8) comprising a fluid duct connection end portion (12) for coupling to a component connection end portion (4), the fluid duct connection end portion (12) comprising a clamping ring seat (14) configured for receiving an adjustable clamping ring therearound, the clamping ring seat (14) extending axially (A) between an entry section (16) and a tube joining section (18), the tube joining section (18) extending into a fluid duct tube portion (10), wherein the clamping ring seat (14) comprises an expansion fold (20) configured to allow at least a portion of the clamping ring seat (14) to expand radially due to a widening of the expansion fold (20); wherein the expansion fold comprises a plurality of oblique sections (20a) extending at least partially in a circumferential direction and at least partially in a radial direction with respect to the clamping ring seat;

and wherein the oblique sections comprise at least a pair of oblique sections that converge towards an apex.

2. Fluid duct according to claim 1, wherein the expansion fold forms a continuous path circumscribing the clamping ring seat.

3. Fluid duct according to claim 1, wherein the expansion fold comprises a wave shape section including a pair of oblique sections.

4. Fluid duct according to claim 3, wherein the wave shape section extends over a circumferential angle of between 10° and 170° with respect to the circumference of the clamping ring seat.

5. Fluid duct according to claim 4, wherein the wave shape section extends over a circumferential angle of between 10° and 60°, with respect to the circumference of the clamping ring seat.

6. Fluid duct according to claim 1, wherein the expansion fold comprises a pair of wave shaped sections arranged evenly around the axis (A) of the fluid duct connection end portion.

7. Fluid duct according to claim 1, wherein the expansion fold comprises oblique sections that extend essentially from a first edge of the clamping ring seat to an opposed second edge of the clamping ring seat, the first and second edges at opposed axial ends of the clamping ring seat.

8. Fluid duct according to claim 1, wherein the tube joining section comprises a tapered radially outward section (25) extending from the clamping ring seat and a tapered radially inward section (24) extending to a fluid duct tube portion (10), an inner surface (22) of the tube joining section receiving a compression sealing protrusion (32) of a sealing ring (6) thereagainst.

9. Fluid duct according to claim 8, wherein the fluid duct connection end portion couples to the component connection end portion via the sealing ring (6) configured to extend along an inner surface of the fluid duct connection end portion from the entry section to the tube joining section.

10. Fluid duct according to claim 9, wherein the sealing ring comprises an entry flange (26) configured to abut against the entry flange of the fluid duct, a mid-section (28) extending along an inner surface of the clamping ring seat, and an end section (30) comprising a compression sealing protrusion (32) extending radially outwardly for compression against the inner surface of the tube joining section.

11. Fluid duct according to claim 10, wherein the end section of the sealing ring comprises at least one flexible sealing lip (34) in addition to the compression sealing protrusion.

12. Fluid duct according to claim 8, wherein the sealing ring comprises an elastomeric polymer.

13. Fluid duct according to claim 1, wherein the fluid duct connection end portion is made of a blow molded polymer.

14. Fluid duct according to claim 1, wherein the expansion fold is in the form of an inwardly indented groove protruding radially inwardly.

15. Fluid duct according to claim 1, wherein the expansion fold has a width in the range of 0.25 to 3 times the wall thickness of the clamping ring seat.

16. Fluid duct according to claim 15, wherein the expansion fold has a width in the range of 0.5 to 2 times the wall thickness of the clamping ring seat.

17. Fluid duct according to claim 1, wherein the expansion fold comprises a groove protruding radially inwardly, a radial depth of the groove in a range of 0.25 to 2 times the thickness of a wall of the clamping ring seat.

18. Fluid duct according to claim 1 that is made of a thermoplastic resin.

* * * * *